United States Patent
Serstad et al.

(10) Patent No.: US 11,685,603 B1
(45) Date of Patent: Jun. 27, 2023

(54) ARTICLE SORTING WITH INTERMINGLED ROBOTS OF ASSORTED SIZES

(71) Applicant: Tompkins Robotics, Inc., Raleigh, NC (US)

(72) Inventors: James M. Serstad, Orlando, FL (US); Michael C. Futch, Orlando, FL (US)

(73) Assignee: Tompkins Robotics, Inc., Raleigh, NC (US)

( * ) Notice: Subject to any disclaimer, the term of this patent is extended or adjusted under 35 U.S.C. 154(b) by 0 days.

(21) Appl. No.: 18/057,366

(22) Filed: Nov. 21, 2022

(51) Int. Cl.
*G06F 7/00* (2006.01)
*B65G 1/137* (2006.01)
*G05D 1/02* (2020.01)

(52) U.S. Cl.
CPC ......... *B65G 1/1373* (2013.01); *G05D 1/0214* (2013.01); *G05D 1/0217* (2013.01); *G05D 1/0234* (2013.01); *G05D 1/0289* (2013.01); *G05D 2201/0216* (2013.01)

(58) Field of Classification Search
CPC .. B65G 1/1373; G05D 1/0214; G05D 1/0217; G05D 1/0234; G05D 1/0289; G05D 2201/0216
USPC .......................................... 700/213–214, 223
See application file for complete search history.

(56) References Cited

U.S. PATENT DOCUMENTS

2019/0197472 A1\* 6/2019 Matsuoka .......... G06Q 10/0834

\* cited by examiner

*Primary Examiner* — Yolanda R Cumbess
(74) *Attorney, Agent, or Firm* — Parthiban A Mathavan

(57) ABSTRACT

System for use in directing an article sorting operation includes a routing engine, first and second vehicles, and a grid comprising a plurality of grid cells, each grid cell having a grid cell length X. First size vehicle has a first vehicle length greater than the grid cell length X and second size vehicle has a second vehicle length greater than the first vehicle length. The system is configured to: receive article information of first and second articles; assign the first article to be transported by the first size vehicle, and the second article to be transported by the second size vehicle; determine a first route for the first size vehicle such that the first route has a first width equaling A\*X, and a second route for the second size vehicle such that the second route has a second width equaling B\*X.

20 Claims, 5 Drawing Sheets

ARTICLE SORTING WITH INTERMINGLED ROBOTS OF ASSORTED SIZES

TECHNICAL FIELD

This invention relates generally to the field of material handling systems, and specifically to an improved automated article sorting system that uses automated mobile robots.

BACKGROUND

Article sorting includes dispensing articles such as parcels, individual items such as units, and other packages going to different destinations at an order fulfillment center or shipping facility. Article sorting can include dispensing articles that come from a plurality of warehouse locations to realize unified consolidation at a single exit or destination point. Ecommerce is becoming ubiquitous with third party logistics (3PL) providers, online e-retailers, and even brick and mortar store operators filling online orders at sorting locations with the sorted articles then delivered to their respective destinations. These sorting locations often comprise automated sorting equipment that include automated transport vehicles that are computer controlled. Automated transport vehicle navigation systems often provide for the automated transport vehicles to navigate through referencing of fiducial markers provided on a floor or platform surface, with the fiducial markers arranged in a grid pattern where the distance between the fiducial markers in the x direction may be set up to be the same as in the y direction, thus forming square grid cells, wherein the fiducial markers are located at the center of each grid cell. The grid cells are typically sized such that the automated transport vehicles, all of which are a same standard size, fit within these grid cells. An automated transport vehicle navigation controller with its associated software operates to plan travel paths for each of these automated transport vehicles such that no two automated transport vehicles are in the same grid cell at the same time.

A bunch of articles such as parcels and individual items that need to be sorted to their end locations may invariably include a small portion of articles that have a physical size that make it impossible to be carried by one of the standard sized automated transport vehicles provided in an automated transport vehicle-based sortation system. For example, large articles comprising less than 1% of the total article count may not fit on the standard automated transport vehicle and therefore require to be manually sorted to its destination container; in other words, a person may have to physically transfer the large article, for e.g., by hand to its destination container. Accordingly, the processing (e.g., sortation or distribution) of such large articles that cannot fit into the standard sized automated transport vehicles would require human workers for physically carrying/transporting such large articles to their respective assigned destination containers. However, this procedure can introduce extra labor costs, delays, and inefficiencies within an otherwise fully automated sorting system.

Accordingly, opportunities exist for an improved sortation system for warehouses and other material handling facilities that overcomes the above noted shortcomings.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use in directing an article sorting operation is provided. The system may include: a server comprising a memory, a processor, and a routing engine; and, a grid comprising a plurality of grid cells for a plurality of computer-controlled vehicles to travel thereon, each grid cell having a grid cell length X. The plurality of computer-controlled vehicles includes a first size vehicle having a first vehicle length greater than the grid cell length X and a second size vehicle having a second vehicle length greater than the first vehicle length. The system may further include: a destination container; and a plurality of articles to be sorted to the destination container, the plurality of articles comprising a first article and a second article. The system is configured to: receive, at the server, of article information corresponding to the first article and the second article; assign, by the server, of the first article to be transported by the first size vehicle to the destination container, and of the second article to be transported by the second size vehicle to the destination container; determine, by the routing engine, of a first route for the first size vehicle such that the first route has a first width equaling A*X, where A is a whole number; and, determine, by the routing engine, of a second route for the second size vehicle such that the second route has a second width equaling B*X, where B is a whole number greater than A.

According to one or more embodiments, a method of directing an article sorting operation is provided. The method may include: receiving, at a server, of article information corresponding to a first article and a second article; assigning, by the server, of the first article to be transported by a first size vehicle to a destination container, and of the second article to be transported by a second size vehicle to the destination container; determining, by a routing engine in communication with the server, of a first route for the first size vehicle such that the first route has a first width equaling A*X, where A is a whole number; and, determining, by the routing engine, of a second route for the second size vehicle such that the second route has a second width equaling B*X, where B is a whole number greater than A.

DETAILED DESCRIPTION OF THE IMPLEMENTATIONS

Figure 1:
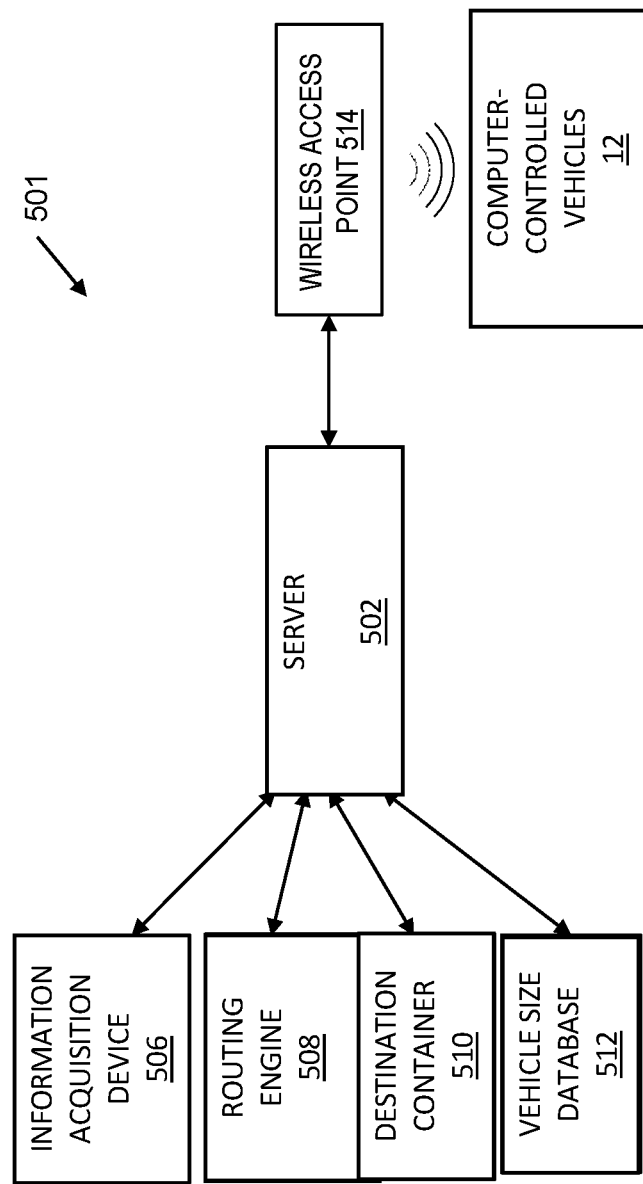
FIG. 1 depicts a block diagram of an exemplary process for an improved sorting system for use with computer controlled automated transport vehicles of intermingled sizes for sorting articles to destination containers, according to one or more implementations of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings. Implementations described herein provide for an improved sorting system for use with automated transport vehicles such as automated transport vehicles of intermingled sizes for sorting articles to destination containers in a manner that addresses inefficiencies.

As noted earlier, material sortation systems can comprise automated sorting equipment that include automated transport vehicle navigation systems that provide for automated transport vehicles of a same/standard size navigating through referencing of fiducial markers provided on grid cells that are sized such that standard sized automated transport vehicles fit within these grid cells. It will be understood that that the implementations and implementations described herein with reference to the figures are described, for ease of reference and understanding, in the context of intermingling of automated transport vehicles of various sized. In the descriptions below, the automated transport vehicle is alternately referred to as computer-controlled vehicle, AMR (automated mobile robot), transport vehicle, first size vehicle, second size vehicle and third size vehicle, and the article carried thereon is referred to as first article, second article and third article. In some embodiments, the automated transport vehicle can take the form of an AMR. To solve the problem associated with the sortation of large articles that cannot be carried by standard sized automated transport vehicles, implementations of the presently disclosed subject matter provides for improved sorting systems and methods that allow for automated transport vehicles of different sizes to operate simultaneously on the same grid platform with associated improved systems and methods operating to plan travel paths for each of these automated transport vehicles of assorted sizes such that they do not collide with each other while the automated transport vehicles navigate the grid platform. The improved sorting systems and methods disclosed further provide for an automated transport vehicle navigation controller with associated software that operates to plan travel paths for each of the different sized automated transport vehicles such that no two automated transport vehicles or portions thereof occupy the same grid cell at the same time.

In an exemplary implementation, for e.g., at a grocery store replenishment application, while several products may fit on a 500 mm size automated transport vehicle, a few products, e.g., a bag of dog food or a case of bottled water, may not fit into a 500 mm size automated transport vehicle and hence would require a 750 mm size automated transport vehicle. On the other hand, some products, e.g., candy, medicine, or cosmetics, may comfortably fit on a 250 mm size automated transport vehicle. Since larger automated transport vehicles cost more and occupy more space, in the implementation described herein it is advantageous to have the optimal combination of right sized automated transport vehicles in order to minimize the cost and size of the overall improved automated transport vehicle system. While there is the potential option of simultaneously operating the 750 mm, 500 mm and 250 mm automated transport vehicles on the same single grid consisting of 750 mm grid cells (grid cells sized for the largest size automated transport vehicle) without any major modifications to the navigation method, there is no space-saving advantage by such a set up since the smallest, i.e., a 250 mm automated transport vehicle, will be allocated a path consisting of whole 750 mm grid cells throughout its travel route. Also, a potential issue that could arise with a 250 mm automated transport vehicle operating on a 750 mm grid is that the edge of the 250 mm automated transport vehicle must be at the edge of the grid cell in order to divert an item that it is carrying into a destination container; however, when centered on the 750 mm grid, the 250 mm automated transport vehicle will be too far from any edge.

Accordingly, to avoid such above noted inefficiencies and limitations, in various implementations, the sorting system as described herein, i.e., system 501, advantageously provides for a large automated transport vehicle (e.g., 750 mm automated transport vehicle) to travel on grid cells sized for the small automated transport vehicle (e.g., 250 mm automated transport vehicle) in the system in such a manner that the various size automated transport vehicles can avoid collisions while traveling on the grid for sortation operations. As an example, in one implementation, the large (e.g., 750 mm size) automated transport vehicles are able to travel on a path shared with 250 mm grid cells wherein the large (e.g., 750 mm size) automated transport vehicle would occupy multiple grid cells at any given time, wherein the system in general, and an advanced navigation and collision-avoidance algorithm forming part of the system in particular, applies a navigation algorithm that keeps track of all grid cells occupied by the large (e.g., 750 mm size) automated transport vehicle at all times such that no collisions or unintended contacts occur during the sorting operations.

Figure 2:
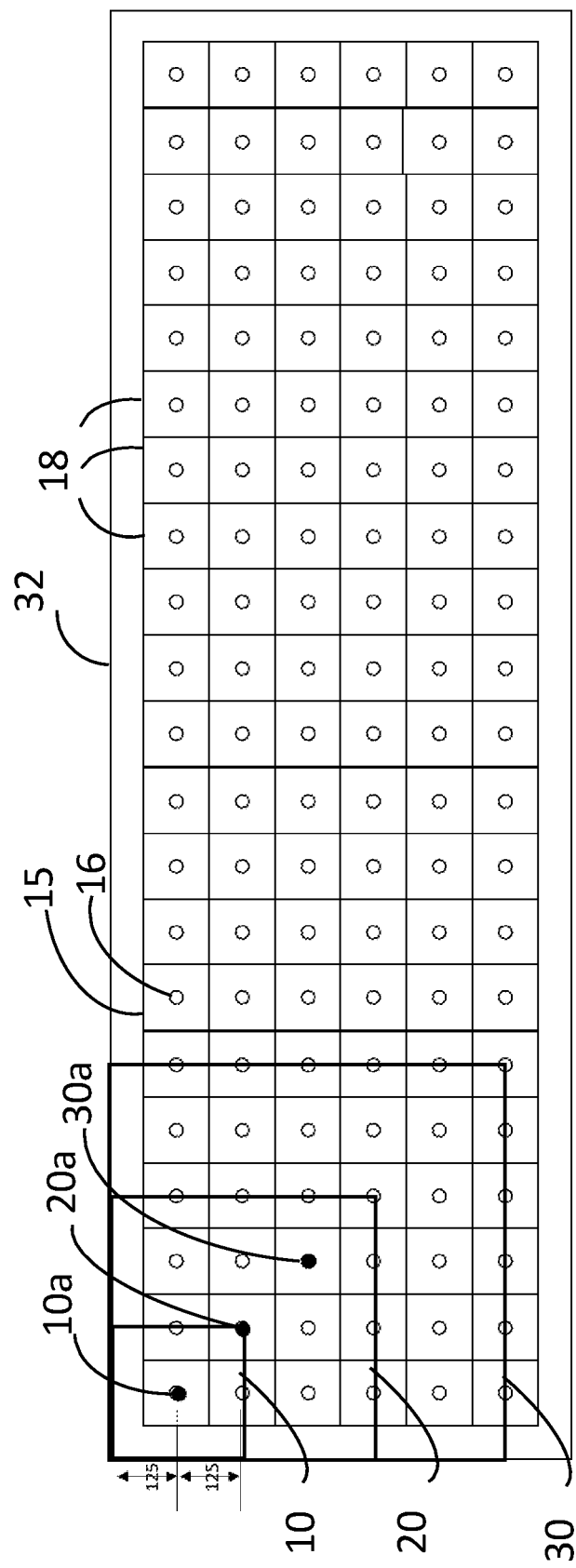
FIG. 2 depicts an example implementation of a platform comprising grid cells for travel thereon by computer controlled automated transport vehicles to destination containers, according to one or more implementations of the presently disclosed subject matter.
Figure 2:
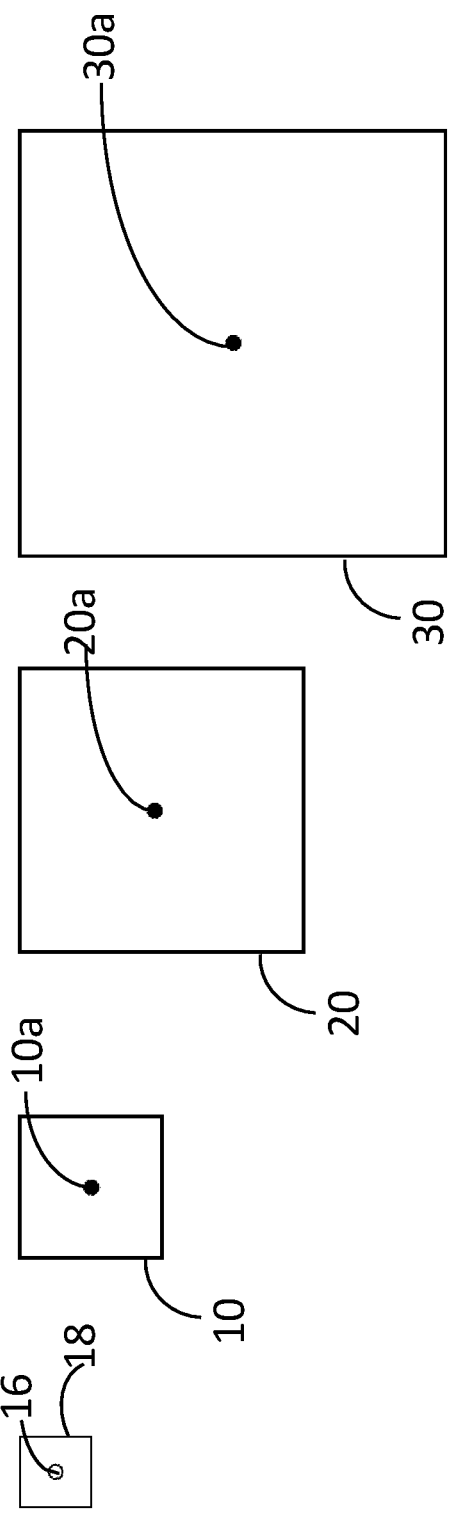

Referring to FIGS. 1-5, a system 501 for use in directing an article sorting operation is provided. In various implementation, system 501 comprises a server 502 comprising, among others a routing engine 508, a memory, and a processor. In some implementations, routing engine 508 may reside external to server 502 but nonetheless in communication with server 502. System 501 further comprises or is in communication with vehicle size database 512, and one or more destination containers 510. System 501 includes additional components such as article information acquisition device 506 (e.g., a scanner, an image capturing equipment, and similar other equipment), and a wireless access point 514, among others. System 501 further comprises grid 15 shown in FIG. 2. As shown in FIG. 2, grid 15 comprises a plurality of grid cells 18. In one implementation, grid 15 may be positioned on a platform 32 having a platform edge. Grid 15 is configured for a plurality of computer-controlled vehicles such as automated transport vehicles or AMRs comprising first size vehicles 112, second size vehicles 212 and third size vehicles 312 (shown in FIG. 3) to travel thereon. Each grid cell 18 includes a grid cell length X and a grid width Y; in at least one implementation, grid cell 18 is square shaped wherein X is the length of each of the four sides of grid cell 18. In other implementations, grid cell 18 can be of triangle, rectangle, or similar other polygonal shapes; in some implementations, sides of grid cell 18 are of equal length. In various implementations, grid cell 18 may be provided with a fiducial marker at or near the geometric center of grid cell 18. The plurality of automated transport vehicles includes a first sized vehicle having a first vehicle length P that is greater than the grid cell length X and a second size vehicle 212 having a second vehicle length Q greater than the first vehicle length. System 501 further includes one or more destination containers 510, wherein system 501 operates to sort a plurality of articles to a destination container 510, the plurality of articles comprising a first article 107 (e.g., 250 mm size) and a second article 207 (e.g., 500 mm size). In various implementations, system 501 is configured for receiving, at the server 502, of article information corresponding to the first article 107 and the second article 207. In one implementation, article information acquisition device 506 interacts with the article to be sorted (e.g., first article 107 or second article 207) to acquire article information present on the article, for e.g., the article information being carried an identifier or tag coupled to the article. Server 502 receives the article information from article information acquisition device 506. System 501 is further configured to assign, by server 502, of the first article 107 to be transported by the first size vehicle 112 to the destination container, and of the second article to be transported by the second size vehicle 212 to the destination container. System 501 is further configured for determination by routing engine 508 of a first route for the first size vehicle such that the first route has a first width equaling A*X, where a is a whole number. System 501 is further configured for determination by routing engine 508 of a second route for the second size vehicle such that the second route has a second width equaling B*X, where B is a whole number greater than A. In order to optimize efficiencies, in various implementations, system 501 ensures that only those grid cells 18 that are occupied or about to be occupied by an automated transport vehicle are cleared to prevent collision or contact between the automated transport vehicles, the article(s) carried thereon, or between an automated transport vehicle and an article; stated differently, system 501 operates to allow grid cells 18 further "down the road" along the path determined for second size vehicle 212 to be occupied by other vehicles until such time second size vehicle 212 is just a few seconds from entering such "down the road" grid cells 18.

In various implementations, routing engine 508 is further configured to determine a turning center for each of the first size vehicle 112 and second size vehicle 212 for the vehicles to stop and divert the first article 107 and second article 207 carried thereon respectively into the destination container. In at least one implementation, routing engine 508 is further configured to calculate a distance of the turning center of the first size vehicle 112 from an edge of grid 15 to be equal to or be about 0.5 times the first size vehicle length P. Routing engine 508 is also configured to calculate the distance of the turning center of the second size vehicle 212 from an edge of the grid to be about 0.5 times the second size vehicle length Q. In at least one implementation, system 501 is configured to direct each of the first size vehicle 112 and second size vehicle 212 to stop at or about the turning center to commence deposition of the first article 107 and second article 207 into destination container 510.

In at least one implementation, system 501 is further configured to calculate a first number of grid cells 18 to remain unoccupied at any instant on the first route for the first size vehicle to travel from an induction location to the destination container. Further, in at least one implementation, the entire route of the vehicle from a point of induction to the destination container is not kept unoccupied by system 501; instead, system 501 keeps unoccupied just a portion of the route that the vehicle is in at any given time or is about to enter imminently.

In at least one implementation, routing engine 508 is configured to calculate the first and second routes such that there is no physical contact between articles and automated transport vehicles, between articles, and between automated transport vehicles. In at least one implementation, each grid cell 18 comprises a fiducial marker 16. In at least one implementation, system 501 calculates the first number of grid cells such that is a square of a positive whole number. As illustrative examples, the first number of grid cells can take the value of 1, 4, 9, 16, 25, 36 and so on. In at least one implementation, the second size vehicle length Q is a whole number multiple of the first size vehicle length P. In at least one implementation, the first size vehicle length P and second size vehicle length Q are whole number multiples of the grid cell length X.

In at least one implementation, system 501 comprises a third size vehicle 312 (e.g., 750 mm size) having a third size vehicle length R greater than the second size vehicle length Q. In at least one implementation, the third size vehicle length R is a whole number multiple of the first size vehicle length P. In at least one implementation, the third size vehicle length R is a whole number multiple of the grid cell length X. In at least one implementation, the system is further configured to determine, by routing engine 508, of a third travel route for the third size vehicle 312 such that the third travel route has a second width equaling C*X, where C is a whole number greater than B.

System 501 further provides for an advanced article deposition technique which advantageously overcomes challenges associated with operating automated transport vehicles of assorted sizes on the same grid. In various implementations, each automated transport vehicle is fitted with a diverting mechanism such as a cross-belt or a tilt tray for diverting the article carried thereon onto a destination container positioned adjacent to the grid area, wherein the grid area (e.g., grid 15) may take the form of a platform or an area of a floor, with several fiducial markers arranged within the grid area. For the article being transported by the automated transport vehicle to be successfully diverted to the location adjacent to the grid area, in one implementation, the edge row of fiducial markers is fixedly positioned at a distance equal to half the width of the automated transport vehicle from the edge of the grid area. As an example, for a 500 mm automated transport vehicle the fiducial marker is positioned at a distance of 250 mm from the edge, whereas for a 250 mm automated transport vehicle the fiducial marker is positioned at a distance of 125 mm from the edge. In such as example, grid 15 comprising of 125 mm grid cells is provided with the distance from the edge of the platform to the edge of a grid cell set at 62.5 mm. System 501 is further configured to calculate a specific center point for the automated transport vehicle to stop and commence depositing (for e.g., by tilting the tray or rotating the cross-belt) of the article carried thereon into a proximal destination container. System 501 allows for larger automated transport vehicle sizes in increments of the dimensions of the smallest automated transport vehicle (for e.g., 250 mm) to be operated on the same grid; for example, 750 mm automated transport vehicles, 500 mm automated transport vehicles, and 250 mm automated transport vehicles (i.e., multiples of 250 mm) can intermingle in a grid consisting of 125 mm grid cells. For a 750 mm automated transport vehicle, the system sets the specific center point for the automated transport vehicle to stop and commence depositing at 375 mm distance from the edge of the platform. For a 500 mm automated transport vehicle, the system sets the specific center point for the automated transport vehicle to stop and commence depositing at 250 mm distance from the edge of the platform. For a 250 mm automated transport vehicle, the system sets the specific center point for the automated transport vehicle to stop and commence depositing at 125 mm distance from the edge of the platform.

In another implementation, 600 mm automated transport vehicles, 400 mm automated transport vehicles, and 200 mm automated transport vehicles (i.e., multiples of 200 mm) are allowed to intermingle in a grid consisting of 100 mm grid cells. In such as example, the implementations described herein provide for a grid consisting of 100 mm grid cells which are 50 mm from the edge of the platform. For a 600 mm automated transport vehicle, the system sets the specific center point for the automated transport vehicle to stop and commence depositing at 300 mm distance from the edge of the platform. For a 400 mm automated transport vehicle, the system sets the specific center point for the automated transport vehicle to stop and commence depositing at 200 mm distance from the edge of the platform. For a 200 mm automated transport vehicle, the system sets the specific center point for the automated transport vehicle to stop and commence depositing at 100 mm distance from the edge of the platform.

In another implementation, 300 mm automated transport vehicles, 200 mm automated transport vehicles, and 100 mm automated transport vehicles (i.e., multiples of 100 mm) can intermingle in a grid consisting of 50 mm grid cells. In such as example, the implementations described herein provide for a grid consisting of 50 mm grid cells which are 25 mm from the edge of the platform. For a 300 mm automated transport vehicle, the system sets the specific center point for the automated transport vehicle to stop and commence depositing at 150 mm distance from the edge of the platform. For a 200 mm automated transport vehicle, the system sets the specific center point for the automated transport vehicle to stop and commence depositing at 100 mm distance from the edge of the platform. For a 100 mm automated transport vehicle, the system sets the specific center point for the automated transport vehicle to stop and commence depositing at 50 mm distance from the edge of the platform.

System 501 includes an improved server collision avoidance protocol that ensures that all grid cells 18 that the automated transport vehicle occupies or is about to imminently occupy are cleared. Based on the size of an article that the transport vehicle is carrying, server 502 of system 501 operates to clear a predetermined number of grids along, and optionally on either side of, the route of the automated transport vehicle carrying the article. In at least one implementation, server 502 of system 501 operates to clear an odd number of grid cells 18 along the route of the transport vehicle for the transport vehicle to travel therethrough without colliding with other vehicles or with articles carried on such other vehicles. In at least one implementation, the smallest transport vehicle in the form of first size vehicle 112 has a length that is twice the length of grid cell 18.

Automated transport vehicles such as first size vehicle 112, second size vehicle 212 and third size vehicle 312 (see FIG. 3, for example) that use grid 15 comprising grid cells 18 for navigation typically turn by stopping over a fiducial marker 16 and rotating approximately 90 degrees or 180 degrees to change the direction of travel. In at least one implementation, the location of fiducial marker 16 may approximately coincide with, or superimpose on, the rotational center of the turn radius. In various implementations, the automated transport vehicles transport articles to be sorted from an induction location to a destination container location. In at least one implementation, an article information acquisition device interacts with the article to be sorted to obtain an article information. System 501 receives this article information, for e.g., from the article information acquisition device, and determines one destination container among a plurality of destination containers to deposit the article into, based on the article information. Each of the automated transport vehicles may include a central processing unit ("CPU") or processor configured to control the automated transport vehicle's movement and actions. Server 502 of system 501 includes its own CPU or processor for communicating with the automated transport vehicles and/or for controlling and directing the movement of each of the automated transport vehicles. Each automated transport vehicle may also be provided with a wireless communication system that is configured to communicate with the wireless communication systems of other automated transport vehicles as well as with the wireless communication system of the centralized controller forming part of server 502. These wireless communication systems may communicate with one another through any available wireless communication technology, for example, Wi-Fi communication (802.11 networks), radiofrequency (RF) communication (for example, in the 425 to 900 MHz frequency range), infrared (IR) communication, Bluetooth® communication, or cellular communication (3G, 4G, 5G, etc.).

In at least one implementation, each of the automated transport vehicles includes a propulsion or locomotion mechanism, for example, in the form of wheels or tracks and at least one motor for driving the wheels or tracks to move and steer the automated transport vehicle. In one implementation, the movement of the automated transport vehicles occurs over the controlled grid 15 where each automated transport vehicle may only move in two perpendicular directions. For instance, the automated transport vehicles may be configured only to move between fiducial markers, each fiducial marker defining a node, in grid 15. Grid 15 may encompass the area between an induction location and a plurality of destination locations. However, other modes of movement of the automated transport vehicles, for e.g., optical navigation, radiofrequency-based navigation, visible light navigation, invisible light navigation, electromagnetic signal-based navigation, SLAM, VSLAM (visual SLAM) and similar other navigation technics are also within the scope of the presently disclosed subject matter. In some implementations, constraint of the automated transport vehicles' movements along a plane in two perpendicular directions may be achieved via any of (i) server 502, (ii) each automated transport vehicle's individual controller, and (iii) the centralized controller, or combinations thereof. In some implementations, the automated transport vehicles are configured to move in any direction along the ground or along a plane, and server 502 operates to avoid collisions through any of the various traffic-control methods known in the art including, for e.g., optical navigation, radiofrequency-based navigation, visible light navigation, invisible light navigation, electromagnetic signal-based navigation, and similar other collision avoidance protocols.

As shown in FIG. 2, in some implementations, the automated transport vehicles are configured to move along grid cells 18 that grid 15 is comprised of, wherein an automated transport vehicle carrying a large article from the induction location to the destination container is given a "wide lane" by server 502. For example, in one implementation, large automated transport vehicles such as second size vehicle 212 and third size vehicle 312 are provided for the transport of large articles such as second article 207 and third article 307 that are difficult or impossible to be transported by a regular size automated transport vehicle such as first size vehicle 112, which is sized to carry regular size articles such as first article 107. To accomplish carriage of large articles, in one implementation as illustrated in FIG. 2, server 502 allocates: first region 10 having a first region center 10a (equal to four grid cells 18; a 2×2-node square) for first size vehicle 112; second region 20 (equal to nine grid cells 18; a 3×3-node square) having a second region center 20a for second size vehicle 212; and third region 30 (equal to 16 grid cells 18; a 4×4-node square) having a third region center 30a for third size vehicle 312. In this implementation, first size vehicle 112 has first vehicle length P, second size vehicle 212 has a second vehicle length Q, third size vehicle 312 has a third vehicle length R, and grid cell 18 has grid cell length X. In this implementation, system 501 provides for the following relationships: second vehicle length Q is a whole number multiple of first vehicle length P; first and second vehicle lengths P, Q are whole number multiples of the grid cell length X; third vehicle length R is greater than second vehicle length Q; third vehicle length R is a whole number multiple of first vehicle length P; and third vehicle length R is a whole number multiple of grid cell length X.

In at least one implementation, grid 15 is modified to offer one wide lateral lane and one wide longitudinal lane along which second size vehicle 212 or third size vehicle 312 moving to (or from) large article locations are configured to travel. In one implementation, this is accomplished, for instance, by determination by the centralized controller operating on, or in the form of, a control server (e.g., server 502 shown in FIG. 1) that a given automated transport vehicle carrying or configured for carrying a large article requires a predetermined number of grid cells 18 or nodes at a time while parked and during travel. This is achieved, for example, by the large article automated transport vehicle (e.g., second size vehicle 212 or third size vehicle 312) indicating that it will be occupying one or more grid cells 18 (each grid cell 18 can be considered to be equivalent to a node) adjacent to a grid cell(s) 18 upon which may be centered. For example, as directed or orchestrated by system 501, the large article automated transport vehicle may appear to other automated transport vehicles to occupy and area equal to four grid cells 18 (a 2×2-node square), nine grid cells 18 (a 3×3-node square), 16 grid cells 18 (a 4×4-node square), or 25 grid cells 18 (a 5×5-node square), and similar other grid areas that represent simple squares of integers, at any given time whereby the other automated transport vehicles are directed by server 502 (or of routing engine 508 forming part of server 502) to leave a wide berth of clearance to the large article automated transport vehicle.

In one implementation, a "large-article grid" (with nodes that do not necessarily correspond to those of the existing "regular" grid) may be utilized by the large article automated transport vehicle (e.g., second size vehicle 212 or third size vehicle 312) with the large article automated transport vehicle moving along such an exclusive/dedicated large-article grid, instead of the regular grid. Server 502 (or alternatively, routing engine 508 or the automated transport vehicle's own controller) may then indicate to other automated transport vehicles that specified grid cells or nodes within a certain distance of the currently occupied large article grid cell(s) or node(s) are occupied. In one implementation, the large article grid may be designed efficiently by system 501 such that the footprint of the large article carrying automated transport vehicle is reduced to a minimum area such as, for e.g., a 2×2-node square, thus minimizing the footprint of the large-article grid and its impact on the movement of the other automated transport vehicles.

The provision of one or more larger automated transport vehicles (e.g., second size vehicle 212 or third size vehicle 312) that are larger than the regular (or small) size automated transport vehicle (e.g., first size vehicle 112) for transferring large articles from the induction location to the destination containers provides for the efficient use of the available square footage of grid 15. In some implementations, server 502 configures the travel path or route of the larger automated transport vehicles such that the larger automated transport vehicles always move along a dedicated large-article grid as determined by server 502 to further reduce the chance of the larger automated transport vehicles (or the large articles carried thereon) from colliding with the regular automated transport vehicles (or the regular articles carried thereon). In some implementations, server 502 configures the travel path or route of the larger automated transport vehicles such that the larger automated transport vehicles always move along a dynamically determined large-article grid as determined by server 502 to reduce the chance of the larger automated transport vehicles (or the large articles carried thereon) from colliding with the regular automated transport vehicles (or the regular articles carried thereon). In one implementation, all induction locations and all destination containers are set up to be large enough to handle the largest articles permitted for sortation by system 501.

In one implementation, grid 15 includes square-shaped grid cells 18 spaced, for example, as a 1×1-foot grid, a 2×2-foot grid, a 3×3-foot grid, a 4×4-foot grid, a 5×5-foot grid, or a 6×6-foot grid. However, grids of other shapes like rectangle, L-shape, and all other shapes as dictated by the application at hand are also within the scope of the presently disclosed subject matter. By constraining the automated transport vehicles in this manner, collisions may be avoided by each automated transport vehicle communicating with server 502 or the central controller to ensure that it is moving to a grid cell that will be unoccupied when it arrives. In one implementation, grid 15 includes nodes that correspond, for e.g., to grid cells 18 with each node including a fiducial marker 16.

In one implementation, each article being inducted onto an automated transport vehicle includes an article information provided on an identifying label, such as an RFID tag, a barcode, a QR code, or the like, wherein the article information may be unique to each article being inducted for sortation by system 501. To track the article being sorted, one or more article information acquisition devices 506 provided at each divestment location operate to read or acquire the article information and communicate, via its respective communicator, the acquired article information to server 502. Server 502, receiving this article information, may then associate the article information with a respective automated transport vehicle into which the corresponding article was inducted or placed, as determined by the article information acquisition device 506 (in the form of, for e.g., a scanner) at the induction location.

In one implementation, an induction location includes an article information acquisition device 506 that acquires the article information from a second article 207 being inducted for sortation to a destination container 510. The article information acquisition device 506 is in communication with server 502. When article information received at the server 502 indicates that second article 207 is a large article and would therefore require a larger automated transport vehicle (e.g., second size vehicle 212) for carrying second article 207 from the induction location to a destination container, server 502 coordinates with routing engine 508 and vehicle size database 512 to determine and execute a travel path for second size vehicle 212 transferring or transporting second article 207 to the destination container. Server 502 then directs second size vehicle 212, to collect second article 207, travel the route determined of the second article 207, and divest second article 207 into the destination container assigned to receive second article 207. In at least one implementation, routing engine 508 is configured to calculate the route or path for second size vehicle 212 such that there is no physical contact between articles and automated transport vehicles, between articles, and between automated transport vehicles throughout the travel route or path of second size vehicle 212. In at least one implementation, the second size vehicle length Q (i.e., the length of second size vehicle 212) is a whole number multiple of the first size vehicle length P (i.e., the length of first size vehicle 112). In at least one implementation, the first size vehicle length P and second size vehicle length Q are whole number multiples of the grid cell length X.

In at least one implementation, system 501 comprises a third size vehicle 312 having a third size vehicle length R greater than the second size vehicle length Q, wherein third size vehicle length R is a whole number multiple of the first size vehicle length P, and wherein the third size vehicle length R is a whole number multiple of the grid cell length X; in such an implementation, server 502, based on the article information of third article 307 received at server 502, coordinates with routing engine 508 and vehicle size database 512 to determine and execute a travel path for third size vehicle 312. Routing engine 508 or server 502 determines a third travel route for the third size vehicle 312 such that the third travel route has a second width equaling C*X, where C is a whole number that is greater than B.

In at least one implementation, system 501 provides for an improved article deposition technique for deposing of third article 307 transported by third size vehicle 312 and of second article 207 transported by second size vehicle 212. For the article being transported by the automated transport vehicle to be successfully diverted to the location adjacent to the grid area, the edge row of fiducial markers is fixedly positioned alongside at a distance equal to half the width of the automated transport vehicle from the edge of the grid area. As an example, for a 500 mm automated transport vehicle the fiducial marker is 250 mm from the edge, whereas for a 250 mm automated transport vehicle the fiducial marker to be positioned 125 mm from the edge. In such as example consisting of 250 mm, 500 mm, and 750 mm automated transport vehicles, the implementations described herein provide for a grid consisting of 125 mm grid cells, with the fiducial marker positioned at a distance of 125 mm from the edge, and with the distance from the edge of the platform to the edge of a grid cell is set at 62.5 mm for a 250 mm automated transport vehicle, at 125 mm for a 500 mm automated transport vehicle, and at 250 mm for a 750 mm automated transport vehicle. System 501 is accordingly configured to calculate a specific center point for the automated transport vehicle to stop and commence depositing (for e.g., by tilting the tray or rotating the cross-belt).

The computer-controlled vehicle such as first size vehicle 112, second size vehicle 212 or third size vehicle 312, may be an autonomous mobile robot (automated transport vehicle). In some implementations, the automated transport vehicle may include a cross-belt for engaging and collecting first article 107, second article 207 or third article 307 to be sorted. An identifier on article (e.g., first article 107, second article 207 or third article 307) may be scanned by an article information acquisition device located at or near the induction location to associate the automated transport vehicle with the particular article (e.g., first article 107, second article 207 or third article 307) carried thereon. Server 502 determines a specific destination container 510 among a plurality of destination containers 510 to deposit the article (e.g., first article 107, second article 207 or third article 307) thereto based on the article information received from the article information acquisition device and directs the automated transport vehicle to transport the article (e.g., first article 107, second article 207 or third article 307) to the assigned destination container 510.

In one implementation, system 501 includes two or more levels separated from one another vertically, wherein grid 15 may be disposed on a top level, and the bottom level may be used for unladen automated transport vehicles to travel and return to an assigned induction location, thus increasing the efficiency of the automated transport vehicles by reducing the traffic. In some implementations, additional levels may be provided between the top level and the bottom level depending on the implementation of the invention. System 501 may further include elevators (not shown) for use by the automated transport vehicles to move between levels. There may further be an automated transport vehicle parking zone provided where the automated transport vehicles may rest or park either while not in use during less busy periods or while waiting for their place in the queue during more busy periods as well as charging locations where the automated transport vehicles can recharge.

Figure 3:
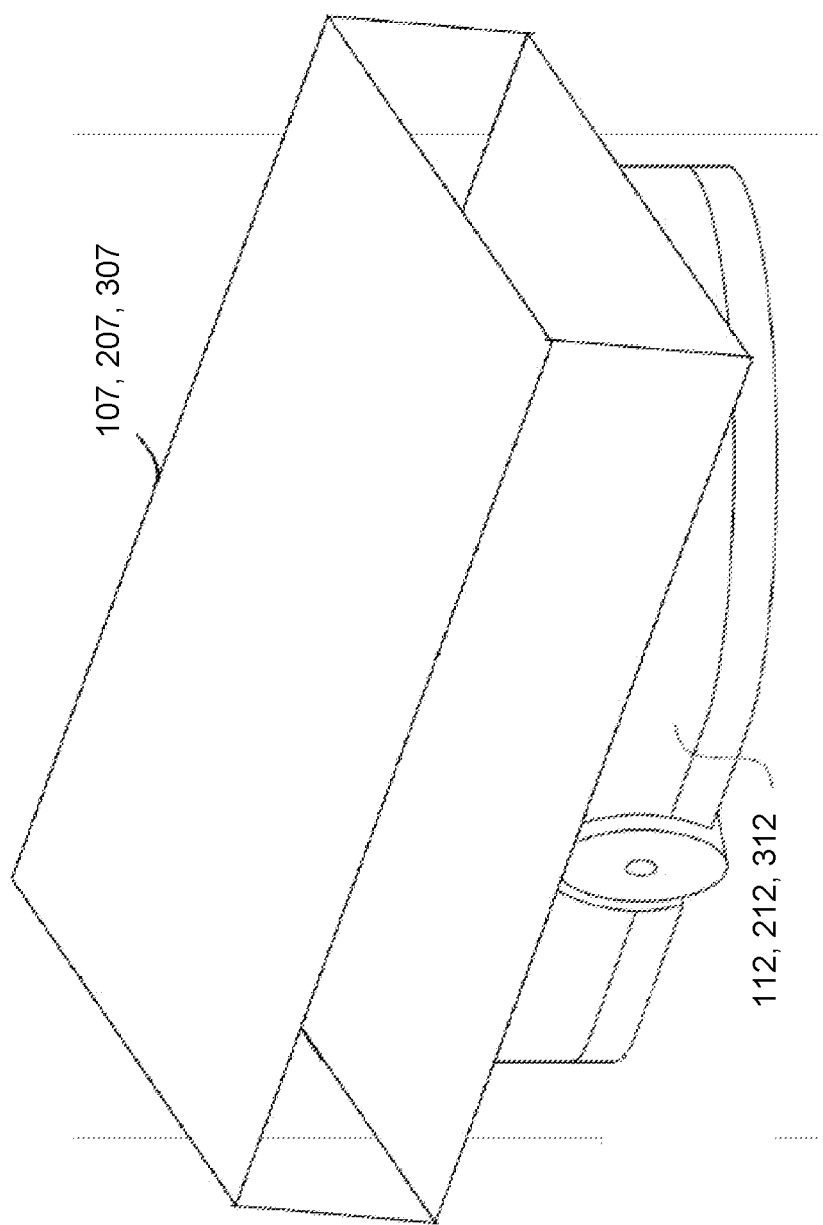
FIG. 3 depicts an example implementation of a computer controlled automated transport vehicle carrying an article to be sorted to a destination container, according to one or more implementations of the presently disclosed subject matter.

FIG. 3 depicts an example of an automated transport vehicle used for transporting articles as part of system 501 as described herein. Referring to FIG. 3, an automated transport vehicle (e.g., in the form first size vehicle 112, second size vehicle 212 or third size vehicle 312) transports an article (e.g., first article 107, second article 207, or third article) with the article including an article information in the form of an identifier or tag that can be read by a scanner, such as an RFID tag, a barcode, or a QR code.

Figure 4:
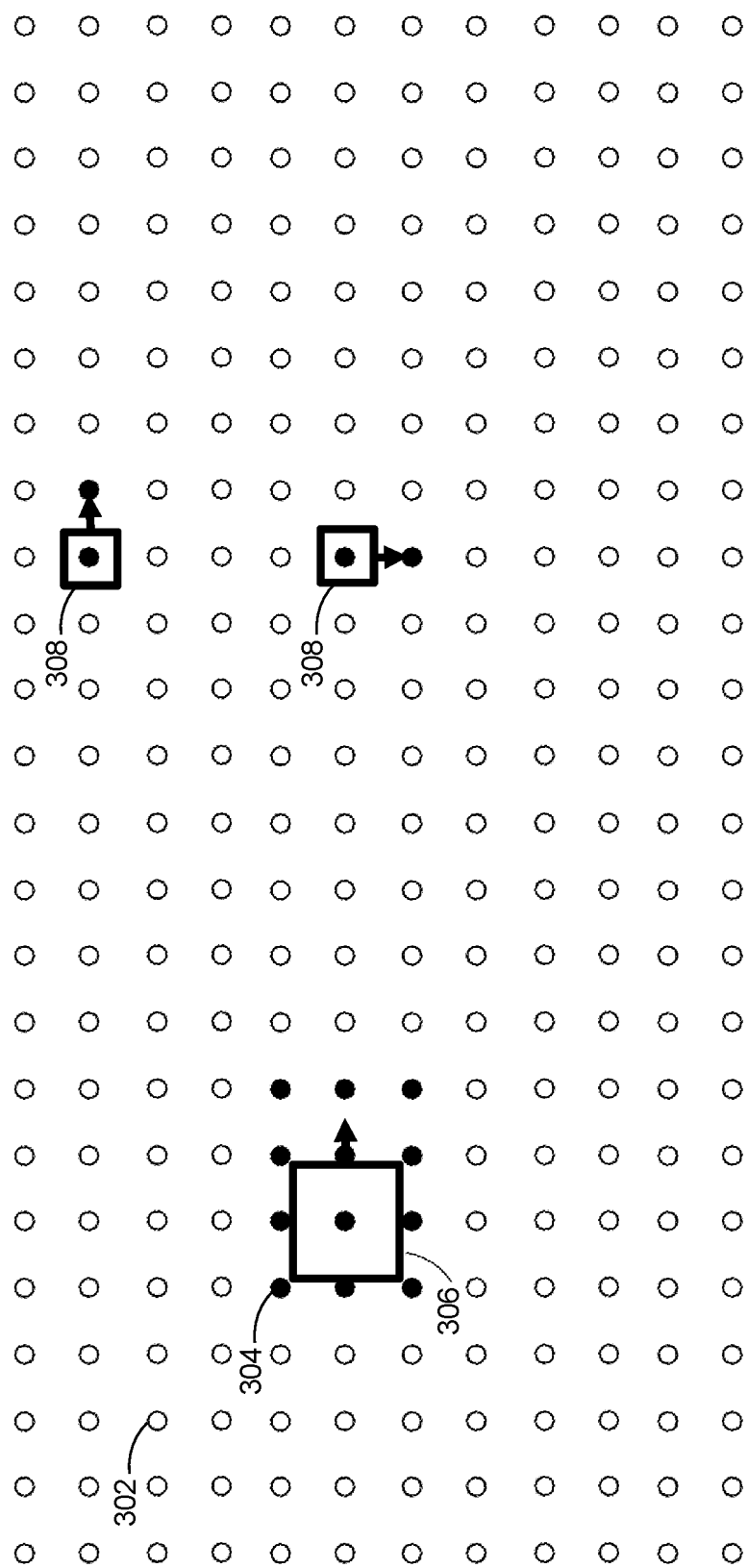
FIG. 4 depicts an example implementation of a square node-based grid with one large article and two regular size articles shown, according to one or more implementations of the presently disclosed subject matter.

FIG. 4 shows a square node-based grid for movement of automated transport vehicles carrying articles, according to at least one embodiment of the presently disclosed subject matter. FIG. 4 also illustrates one example of how collisions are prevented when a large article (e.g., second article 207 or third article 307) is being carried with the large (or larger) automated transport vehicle carrying the large article assigned a large clearance area in the form of fourth region 306 to avoid collisions. In FIG. 4, each empty circle represents an unoccupied node 302 in grid 15 and each filled circle represents an occupied node 304 in grid 15. In at least one implementation, each node, whether occupied or unoccupied is assigned an area equal to the area of one grid cell 18, with each node including a fiducial marker 16. In at least some implementations, the fiducial markers 16 operate as rotational centers of the automated transport vehicles as the automated transport vehicles turn to change direction or to divert (for e.g., with respect to the fiducial markers 16 along the edge of grid 15) an article carried thereon into a proximal destination container 510. The area depicted in FIG. 4 may be located between an induction location and the destination container 510, although neither are contained within the shown area. As FIG. 4 shows, each of the nodes may either be unoccupied (e.g., unoccupied nodes 302 are shown as the empty circles in FIG. 4) or occupied or about to be occupied (e.g., occupied nodes 304 that may include some about to be occupied nodes are shown as filled circles in FIG. 4). For regular-sized articles, a node is occupied if an automated transport vehicle (e.g., first size vehicle 112) carrying an article (e.g., first article 107) is either currently at that node or moving toward that node. Each of the three squares in FIG. 4 corresponds to an automated transport vehicle, with fourth region 306 corresponding to area required for safe transit by second size vehicle 212 or third size vehicle 312, and fifth region 308 corresponding to area required for safe transit by first size vehicle 112, with the arrows attached thereto representing each automated transport vehicle's direction of motion. As shown in FIG. 4, the maximum number of nodes simultaneously assigned for use by an automated transport vehicle carrying a regular-sized article (represented by the fifth regions 308 in the form of smaller squares) is two, i.e., a first node that the automated transport vehicle is currently at (or leaving) and a second node to which the automated transport vehicle is heading towards or is about to enter. On the other hand, an automated transport vehicle such as second size vehicle 212 or third size vehicle 312 carrying a large article such as second article 207 or third article 307 (represented by the fourth region 306 in the form of a larger square) is allocated, by server 502, nodes adjacent to the central node in which the large article automated transport vehicle is travelling to or from. Thus, in the example shown in FIG. 4, second size vehicle 212 carrying second article 207 (or third size vehicle 312 carrying third article 307) is shown as effectively being assigned between nine and twelve nodes at a time by server 502, to thereby advantageously prevent collisions between automated transport vehicles, between an article and an automated transport vehicle and between articles being carried by the automated transport vehicles; however, it is to be understood that the number of additional nodes occupied by even larger size articles (e.g., third article 307) can be a higher (e.g., 16 or 20 nodes) than what is shown in FIG. 4.

A given application in which whether the implementation illustrated in FIG. 4 might prove better will depend upon several factors such as, for example, the geometry of grid 15, the size and shape of the large article, the number of automated transport vehicles on grid 15, and the distance between nodes in grid 15 and similar other factors. In another exemplary grid implementation, server 502 may logically alternate between the regular grid and the large-article grid based on the circumstances with server 502 configured to dynamically determine which is more efficient based on the circumstance and implement the most efficient solution.

Figure 5:
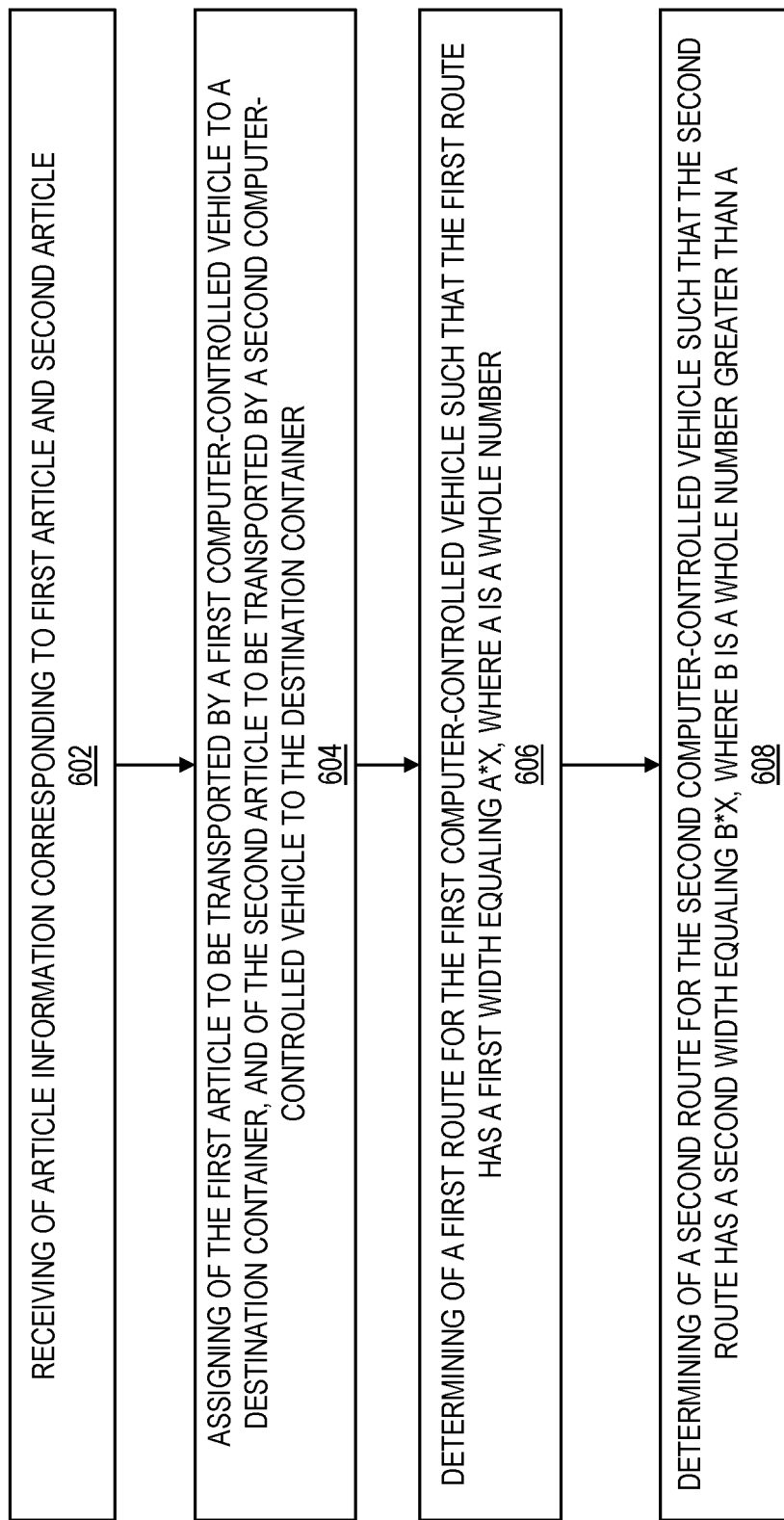
FIG. 5 depicts an exemplary flowchart of an exemplary implementation of an improved sorting system for use with automated transport vehicles of intermingled sizes for sorting articles to destination containers, according to one or more implementations of the presently disclosed subject matter.

FIG. 1 depicts a block diagram of an exemplary implementation of an improved system for use with automated transport vehicles of intermingled sizes for sorting articles to destination containers, the improved system comprising an improved server collision avoidance protocol as described herein. Referring to FIG. 5, in one implementation, system 501 comprises server 502, routing engine 508, vehicle size database 512, article information acquisition device 506 (e.g., a scanner, an image capturing equipment, and similar other equipment), computer-controlled vehicles 12 (analogous to first size vehicle 112, second size vehicle 212 and third size vehicle 312), destination containers 510, and a wireless access point 514, among others, which are depicted in a representative manner as blocks representing a generic descriptor of the technology. Server 502 is a control server that is configured for communicating with one or more components of system 501 as described herein, and as shown, for example, in FIG. 1. In one implementation, server 502 includes memory, a processor, and/or one or more communication interfaces communicatively coupled to each other. A network may form part of system 501, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, computer-controlled vehicles 12 (these are analogous to first size vehicle 112, second size vehicle 212 and third size vehicle 312) and server 502 may communicate over the network with the cloud. In some implementations, one or more components of system 501 may reside in the cloud. For example, in one implementation, server 502 may reside in the cloud. In at least one implementation, server 502 may be in communication with one or more third-party servers, such as warehouse management system servers and automated transport vehicle operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Each of the components shown in FIGS. 1-5 may be in communication with one or more other components through a wired and/or a wireless network. For example, the cloud, the server 502 may further communicate with routing engine 508, vehicle size database 512, article information acquisition device 506, computer-controlled vehicles 12, destination containers 510, and wireless access point 514 over a network.

FIG. 5 depicts a flowchart of an exemplary process corresponding to system 501. The exemplary process shown in FIG. 5 may be implemented, for example, by server 502. Referring to FIG. 5, at step 602, an article information corresponding to first article 107 and second article 207 is received, for e.g., at server 502; in one implementation, server 502 receives the article information from article information acquisition device 506. At step 604, server 502 assigns first article 107 to be transported by the first size vehicle 112 to the destination container; server 502 further assigns second article 207 to be transported by the second size vehicle (where the second size vehicle is larger than the first size vehicle, or the second size vehicle has a larger cargo carrying capacity that the first size vehicle) to destination container 510. At step 606, routing engine 508 (or server 502) determines a first route for the first size vehicle 112 such that the first route has a first width equaling A*X, where A is a whole number and where X is the length of a grid cell. At step 608, routing engine 508 (or server 502) determines a second route for the second size vehicle such that the second route has a second width equaling B*X, where B is a whole number greater than A.

According to at least one implementation, a method of directing an article sorting operation comprises: receiving, at a server, of article information corresponding to a first article and a second article; assigning, by the server, of the first article to be transported by a first size vehicle to a destination container, and of the second article to be transported by a second size vehicle to the destination container; determining, by a routing engine in communication with the server, of a first route for the first size vehicle such that the first route has a first width equaling A*X, where A is a whole number; and, determining, by the routing engine, of a second route for the second size vehicle such that the second route has a second width equaling B*X, where B is a whole number greater than A.

According to one implementation, the method further comprises: determining, by the routing engine, a turning center for the first and second size vehicles to stop and divert the first and second articles carried thereon into the destination container.

According to one implementation, the method further comprises: calculating, by the routing engine, of a distance of the turning center of a first size vehicle from an edge of a grid to be about 0.5 times a first vehicle length; and calculating, by the routing engine, of the distance of the turning center of the second size vehicle from an edge of the grid to be about 0.5 times a second vehicle length; wherein the grid comprises a plurality of grid cells for a plurality of computer-controlled vehicles to travel thereon, each grid cell having a grid cell length X, the first size vehicle has a first vehicle length greater than the grid cell length X, and the second size vehicle has the second vehicle length greater than the first vehicle length.

According to one implementation, the method further comprises: calculating, by the routing engine, of a first number of grid cells to remain unoccupied at any instant on the first route for the first size vehicle to travel from an induction location to the destination container, wherein a grid comprises a plurality of the grid cells for a plurality of computer-controlled vehicles to travel thereon, each grid cell having a grid cell length X.

According to one implementation, the method further comprises: calculating, by the routing engine, of the first and second routes such that there is no physical contact between articles and a plurality of computer-controlled vehicles traveling about a grid comprising a plurality of grid cells for the plurality of computer-controlled vehicles to travel thereon, between articles, and among the plurality of computer-controlled vehicles.

According to one implementation, the method further comprises: determining, by the routing engine, of a third travel route for a third size vehicle having a third vehicle length greater than the second vehicle length such that the third travel route has a second width equaling C*X, where X is a whole number greater than B.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport vehicle set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

What is claimed is:

1. A system for use in directing an article sorting operation, the system comprising:
a server comprising a memory, a processor, and a routing engine;
a grid comprising a plurality of grid cells for a plurality of computer-controlled vehicles to travel thereon, each grid cell having a grid cell length X;
the plurality of computer-controlled vehicles comprising a first size vehicle having a first vehicle length greater than the grid cell length X and a second size vehicle having a second vehicle length greater than the first vehicle length;
a destination container;
a plurality of articles to be sorted to the destination container, the plurality of articles comprising a first article and a second article;
wherein the system is configured to:
receive, at the server, article information corresponding to the first article and the second article;
assign, by the server, the first article to be transported by the first size vehicle to the destination container, and of the second article to be transported by the second size vehicle to the destination container;
determine, by the routing engine, a first route for the first size vehicle such that the first route has a first width equaling A*X, where A is a whole number;
determine, by the routing engine, a second route for the second size vehicle such that the second route has a second width equaling B*X, where B is a whole number greater than A.

2. The system of claim 1, wherein the routing engine is further configured to:

determine a turning center for the first and second size vehicles to stop and divert the first and second articles carried thereon into the destination container.

3. The system of claim 2, wherein the routing engine is further configured to:
calculate a distance of the turning center of the first size vehicle from an edge of the grid to be about 0.5 times the first vehicle length; and
calculate the distance of the turning center of the second size vehicle from an edge of the grid to be about 0.5 times the second vehicle length.

4. The system of claim 2, wherein the system is further configured to direct each of the first and second size vehicles to stop at or about the turning center to commence deposition of the first and second articles into the destination container.

5. The system of claim 1, wherein the system is further configured to calculate a first number of grid cells to remain unoccupied at any instant on the first route for the first size vehicle to travel from an induction location to the destination container.

6. The system of claim 5, wherein the first number of grid cells is a square of a positive whole number.

7. The system of claim 1, wherein the routing engine is further configured to calculate the first and second routes such that there is no physical contact between: articles and the plurality of computer-controlled vehicles, between articles, and among the plurality of computer-controlled vehicles.

8. The system of claim 1, wherein each grid cell comprises a fiducial marker.

9. The system of claim 1, wherein the second vehicle length is a whole number multiple of the first vehicle length.

10. The system of claim 1, wherein the first and second vehicle lengths are whole number multiples of the grid cell length X.

11. The system of claim 1, further comprising a third size vehicle having a third vehicle length greater than the second vehicle length.

12. The system of claim 11, wherein the third vehicle length is a whole number multiple of the first vehicle length.

13. The system of claim 11, wherein the third vehicle length is a whole number multiple of the grid cell length X.

14. The system of claim 11, therein the system is further configured for: determining, by the routing engine, a third travel route for the third size vehicle such that the third travel route has a second width equaling C*X, where X is a whole number greater than B.

15. A method of directing an article sorting operation, the method comprising:
receiving, at a server, article information corresponding to a first article and a second article;
assigning, by the server, the first article to be transported by a first size vehicle to a destination container, and the second article to be transported by a second size vehicle to the destination container;
determining, by a routing engine in communication with the server, a first route for the first size vehicle such that the first route has a first width equaling A*X, where A is a whole number;
determining, by the routing engine, a second route for the second size vehicle such that the second route has a second width equaling B*X, where B is a whole number greater than A.

16. The method of claim 15, further comprising: determining, by the routing engine, a turning center for the first and second size vehicles to stop and divert the first and second articles carried thereon into the destination container.

17. The method of claim 16, further comprising:
calculating, by the routing engine, distance of the turning center of a first size vehicle from an edge of a grid to be about 0.5 times a first vehicle length; and
calculating, by the routing engine, the distance of the turning center of the second size vehicle from an edge of the grid to be about 0.5 times a second vehicle length;
wherein the grid comprises a plurality of grid cells for a plurality of computer-controlled vehicles to travel thereon, each grid cell having a grid cell length X, the first size vehicle has a first vehicle length greater than the grid cell length X, and the second size vehicle has the second vehicle length greater than the first vehicle length.

18. The method of claim 15, further comprising: calculating, by the routing engine, a first number of grid cells to remain unoccupied at any instant on the first route for the first size vehicle to travel from an induction location to the destination container, wherein a grid comprises a plurality of the grid cells for a plurality of computer-controlled vehicles to travel thereon, each grid cell having a grid cell length X.

19. The method of claim 15, further comprising: calculating, by the routing engine, the first and second routes such that there is no physical contact between articles and a plurality of computer-controlled vehicles traveling about a grid comprising a plurality of grid cells for the plurality of computer-controlled vehicles to travel thereon, between articles, and among the plurality of computer-controlled vehicles.

20. The method of claim 17, further comprising: determining, by the routing engine, a third travel route for a third size vehicle having a third vehicle length greater than the second vehicle length such that the third travel route has a second width equaling C*X, where X is a whole number greater than B.

* * * * *